Oct. 13, 1970  J. J. QUACKENBUSH  3,533,884
FIBER REINFORCED THERMOPLASTIC FILM AND
METHOD OF MANUFACTURE THEREFOR
Filed March 9, 1967
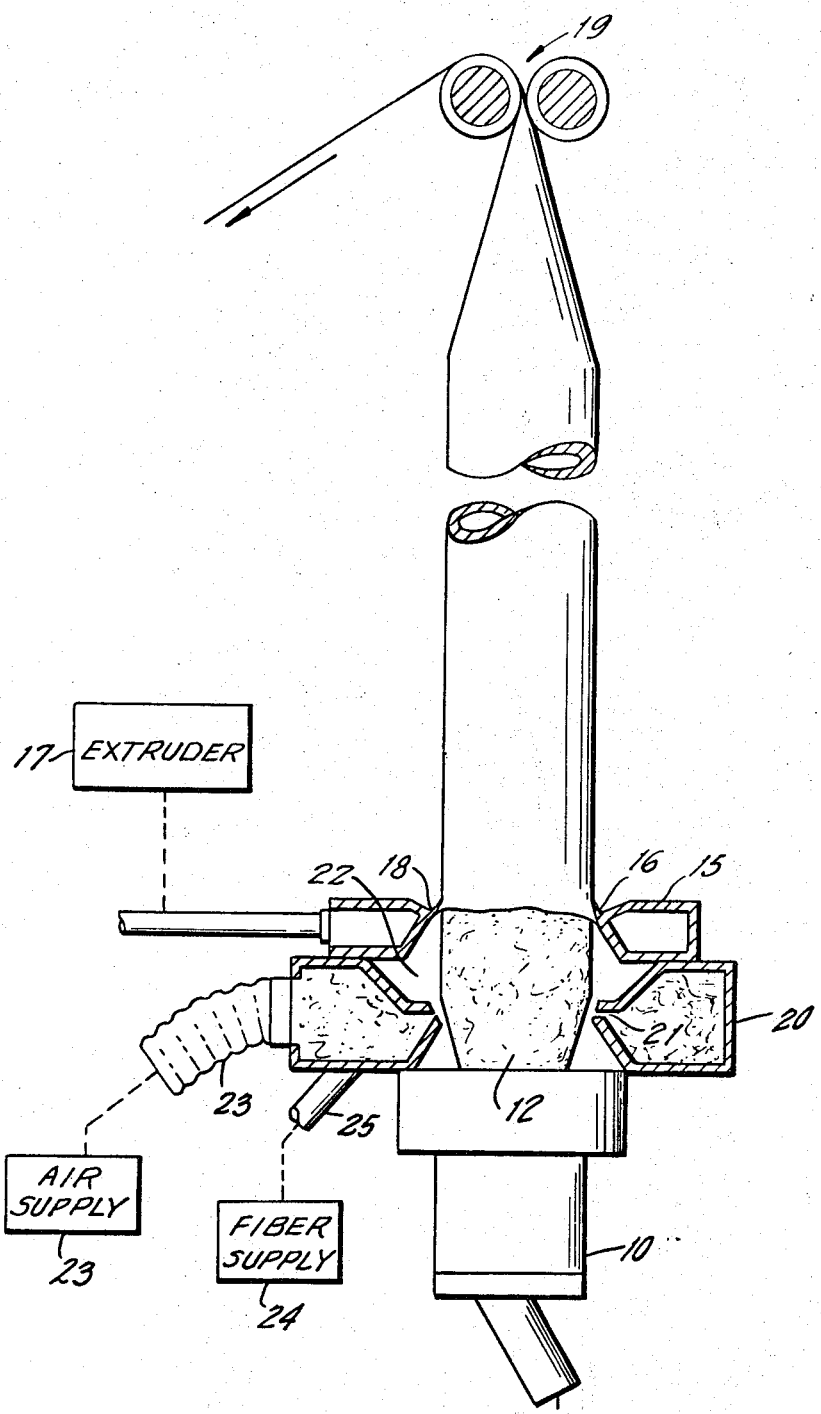
INVENTORS
JOHN J. QUACKENBUSH
BY Allen A. Meyer, Jr.
ATTORNEY 3,533,884
FIBER REINFORCED THERMOPLASTIC FILM AND
METHOD OF MANUFACTURE THEREFOR
John J. Quackenbush, Monroe, Conn., assignor to National Distillers and Chemical Corporation, New York, N.Y., a corporation of Virginia
Filed Mar. 9, 1967, Ser. No. 621,822
Int. Cl. B29c 17/06
U.S. Cl. 156—501             2 Claims

ABSTRACT OF THE DISCLOSURE

Two concentric tubes of thermoplastic material are extruded from axially spaced blown film extrusion dies. Fiber material is injected between the tubes before the tubes laminate to one another with the fiber becoming encapsulated between the tubes.

---

This invention relates to blown plastic film, and more specifically relates to a novel method of manufacture of a plastic film product having an interior fiber layer captured between two laminated thermoplastic tubes.

In accordance with the invention, two standard blown film extrusion dies are coaxially mounted and are axially spaced from one another to extrude respective tubes of similar or diverse materials which laminate above the upper die. The upper die is more specifically a ring shaped die surrounding the interior tube extruded from the lower die. A ring shaped pressurized chamber is then located below the upper die and above the lower die and is loaded with a suitable fiber or flock material, blowing the fiber onto the interior tube as it moves upwardly from its die. This fiber coating is then captured by the second and outer tube when it is extruded over the interior tube from the lower die.

Accordingly, a primary object of this invention is to provide a novel reinforced structure for blown plastic film.

A further object of this invention is to provide a novel high strength plastic film for packaging of high weight materials such as chemical compounds, peat moss, and the like.

Another object of this invention is to reinforce a blown plastic tube with relatively long fibers.

Yet another object of this invention is to provide a novel plastic film which has high tear and puncture resistance.

These and other objects will become apparent from the following description when taken in connection with the drawing which partially schematically shows the apparatus and process of the invention.

Referring now to the drawing, there is provided a first standard blown film die 10 which is connected to an extruder 11 and extrudes a tubular film 12 of thermoplastic material such as a low density polyethylene. A suitable source of air (not shown) is provided to inflate air into the interior of the tube to keep the tube inflated in the usual manner.

A second, but ring shaped plastic extrusion die 15 having a radially interiorly disposed discharge orifice 16 is axially spaced above die 10 and is connected to a second extruder 17. The second extruder 17 may supply the same type plastic material as extruder 11, or, if desired, the two extruders may supply diverse materials. The tube 18, extruded through orifice 16, concentrically surrounds and subsequently laminates to the interior tube 12, with the composite tube moving upward and into haul-off nip rolls. The flattened web issuing from nip rolls 19 is then collected on a suitable storage roll or is supplied to a suitable bag forming machine.

In accordance with the invention, a ring shaped chamber 20 having an interior circular discharge orifice 21 is disposed between dies 10 and 15 and defines, with the bottom of die 15 and the top of die 10, a generally closed chamber 22 surrounding tube 12. A suitable pressurized air supply 23 is connected to chamber 20 by flexible hose 23.

Fibers or a suitable flock material is then loaded into chamber 20 from a hopper, schematically shown by block 24 connected to conduit 25 which enters chamber 20. Typical of the fiber which could be used are: silk flock; fiber strands; jute fiber; glass; and elastomeric fibers such as synthetic rubber compounds, leather, polyurethanes and long strand polypropylene fibers.

Where a long strand fiber is to be used, preferably the chamber 20 should be rotated or oscillated.

In operation, and due to overpressure within chamber 20, the flocking material in the chamber will be blown outwardly and onto the surface of tube 12 as it passes orifice 21. This flocking material will then be encapsulated between the exterior of tube 12 and the interior of tube 18.

Although this invention has been described with respect to its preferred embodiments, it should be understood that many variations and modifications will now be obvious to those skilled in the art, and it is preferred, therefore, that the scope of the invention be limited not by the specific disclosure herein but only by the appended claims.

The embodiments of the invention in which an exclusive privilege or property is claimed are defined as follows:

1. Apparatus for forming a laminated tube of thermoplastic material having an encapsulated flock therein comprising first and second axially spaced coaxial extrusion dies for extruding blown plastic tubes; said second die being ring shaped and having an inwardly directed annular discharge orifice; a ring shaped pressurized container coaxial with said first and second extrusion dies and having an inwardly directed annular discharge orifice; said ring shaped container positioned axially between said first and second extrusion dies; extruder means, gas pressure supply means, and a fiber supply means; said first and second extrusion dies connected to said extruder means; the interior of said container connected to said gas pressure supply means and said fiber supply means.

2. The apparatus as set forth in claim 1 which includes a pair of haul-off nip rolls positioned above said second extrusion die.

References Cited

UNITED STATES PATENTS

| | | | |
|---|---|---|---|
| 2,491,152 | 12/1949 | Beidle | 156—244 X |
| 2,750,631 | 6/1956 | Johnson. | |
| 2,753,596 | 7/1956 | Bailey | 156—244 X |
| 2,888,954 | 6/1959 | Gates | 156—244 X |
| 3,310,447 | 3/1967 | Matthews | 156—244 |
| 3,406,248 | 10/1968 | Bunish et al. | 264—173 X |

CARL D. QUARFORTH, Primary Examiner

H. E. BEHREND, Assistant Examiner

U.S. Cl. X.R.

156—244, 179, 390; 18—14; 264—173